United States Patent
Wu et al.

(10) Patent No.: US 11,620,146 B2
(45) Date of Patent: Apr. 4, 2023

(54) SYSTEM AND METHOD TO COMMIT CONTAINER CHANGES ON A VM-BASED CONTAINER

(71) Applicant: VMware, Inc., Palo Alto, CA (US)

(72) Inventors: Junfei Wu, Beijing (CN); Xiang Yu, Beijing (CN); Xiaodong Ye, Beijing (CN); Fangchi Wang, Beijing (CN); Haitao Zuo, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 226 days.

(21) Appl. No.: 16/986,899

(22) Filed: Aug. 6, 2020

(65) Prior Publication Data
US 2022/0012079 A1    Jan. 13, 2022

(30) Foreign Application Priority Data
Jul. 10, 2020    (WO) ................ PCT/CN2020/101282

(51) Int. Cl.
   *G06F 9/455* (2018.01)
   *G06F 8/61* (2018.01)
   *G06F 9/50* (2006.01)

(52) U.S. Cl.
   CPC ............ *G06F 9/45545* (2013.01); *G06F 8/63* (2013.01); *G06F 9/45558* (2013.01); *G06F 9/5027* (2013.01); *G06F 2009/45562* (2013.01)

(58) Field of Classification Search
   CPC ...... G06F 9/45545; G06F 8/63; G06F 9/5027; G06F 2009/45562
   See application file for complete search history.

(56) References Cited

U.S. PATENT DOCUMENTS

| | | | |
|---|---|---|---|
| 2011/0040812 A1* | 2/2011 | Phillips ............... | G06F 9/45541 707/822 |
| 2016/0359955 A1 | 12/2016 | Gill et al. | |
| 2017/0264684 A1 | 9/2017 | Spillane et al. | |
| 2021/0042141 A1* | 2/2021 | De Marco ............. | G06F 16/148 |
| 2021/0103450 A1* | 4/2021 | Prasad ................ | G06F 9/45558 |
| 2021/0240671 A1* | 8/2021 | Fong ........................ | H04L 67/06 |
| 2022/0197689 A1* | 6/2022 | Hotinger ................... | G06F 8/63 |

FOREIGN PATENT DOCUMENTS

EP    3304295 A1    4/2018

* cited by examiner

*Primary Examiner* — Dong U Kim
(74) *Attorney, Agent, or Firm* — Patterson & Sheridan, LLP (57) ABSTRACT

Disclosed herein are embodiments for committing changes of an image of a virtual machine-based container running on a host computer system. A starting image for a container is obtained from a guest starting folder, and while the container runs the starting image changes to the image made by the running container are captured in a guest folder that is union mounted with the guest starting folder. Another union folder, which is the union of a new host folder and the starting folder, contains the changed image which can be used for the container or transferred to a different container.

20 Claims, 7 Drawing Sheets

SYSTEM AND METHOD TO COMMIT CONTAINER CHANGES ON A VM-BASED CONTAINER

CROSS-REFERENCE TO RELATED APPLICATION(S)

This application claims benefit of and priority to International Application No. PCT/CN2020/101282, filed Jul. 10, 2020, which is hereby assigned to the assignee hereof and hereby expressly incorporated by reference herein in its entirety as if fully set forth below and for all applicable purposes.

BACKGROUND

A model for designing, deploying, and running applications is available in which the applications run as lightweight containers. Containers receive runnable images by having them pulled from a repository in an image registry, and an image comprises several read-only layers, each of which is a set of files in the namespace of a file system that is unique to the container.

In some arrangements, the container and the runtime run natively on a host computer system. In other arrangements, the container is separated from the runtime and is instead run in a virtual machine (VM) running on the host computer system. In the latter arrangement, it is desirable that any changes in the image that occur in the VM-based container be available for building a new image and that the new image can be committed to the registry to record the changes for later inspection or use.

SUMMARY

Embodiments provide using a shared file system and a union mount, such as in Linux, to get image changes to a file system on the host and then update the image in the virtual machine from the file system on the host. The union mount combines multiple directories into one that appears to contain their combined contents.

One embodiment is a method for committing changes of an image of a container running in a virtual machine (VM) on a host computer system. The method includes obtaining a guest starting folder containing a starting image for the container, and while the container is running the starting image, storing changes made by the running container to the starting image in a first union folder to generate a changed image for the container, where the first union folder is a union of a new guest folder and the guest starting folder, and the new guest folder reflects the changes in the first union folder. The method further includes forming a second union folder as a union of a new host folder and the guest starting folder, where the new host folder contains the changes to the starting image, and the second union folder contains the changed image.

Further embodiments include a computer-readable medium containing instructions for carrying out one more aspects of the above method, and a system configured to carry out one or more aspects of the above method.

DETAILED DESCRIPTION

Described herein are embodiments for capturing changes to an image of a container during the running of the container in a guest operating system of a virtual machine running on a host computer system while the runtime for the container runs natively on the host computer system. The captured changes are then made available to both a repository of images in a registry on the host and to the guest operating system as well as other guest operating systems running on the host computer system.

Figure 1:
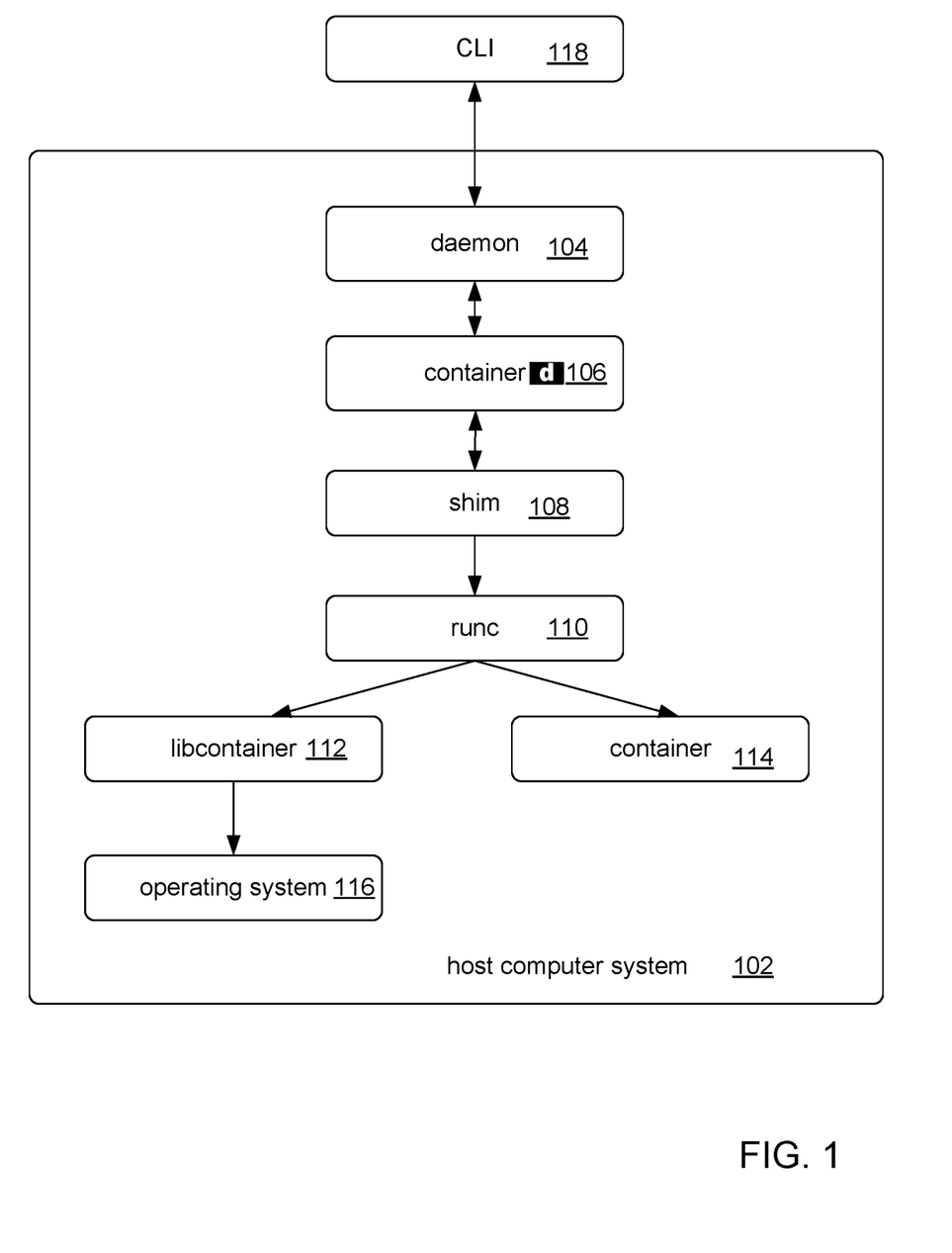
FIG. 1 depicts an architecture for running a container on a host computer system.

FIG. 1 depicts a reference architecture for running a container on a host computer system. In the figure, the host computer system includes an operating system 116 that is coupled to a system library called libcontainer 112. A program, runc 110, is coupled to libcontainer 112 and to the container 114 itself. Coupled between runc 110 and a program called containerd 106 is a shim 108. The containerd 106 program is coupled to a daemon 104 that receives commands from a command-line interface 118 (CLI).

The program, runc 110, is a wrapper around libcontainer 112 and is the program that creates containers. The libcontainer 112 marshals all of the needed namespaces from the operating system 116 to create a container 114.

The program containerd 106 is a type of runtime, i.e., a process that manages the life cycle operations of a container, such as start, pause, stop and remove.

The shim program 108 is present to become the parent process of a newly created container 114 after runc 110 completes the creation of the container 114.

The daemon 104 is a process that includes an application programming interface (API) for receiving a request from the CLI 118 and for performing image management, image builds, authentication, security, networking, and orchestration. Common CLI requests include those in Table 1.

TABLE 1

| | |
|---|---|
| create | create a new container |
| commit | create a new image from a container's changes |
| image | manage images |
| pause | pause all processes within one or more containers |
| pull | pull an image or repository from a registry |
| push | push an image or repository to a registry |
| restart | restart one or more containers |
| rm | remove one or more containers |
| run | run a command in a new container |
| start | start one or more stopped containers |

Figure 2:
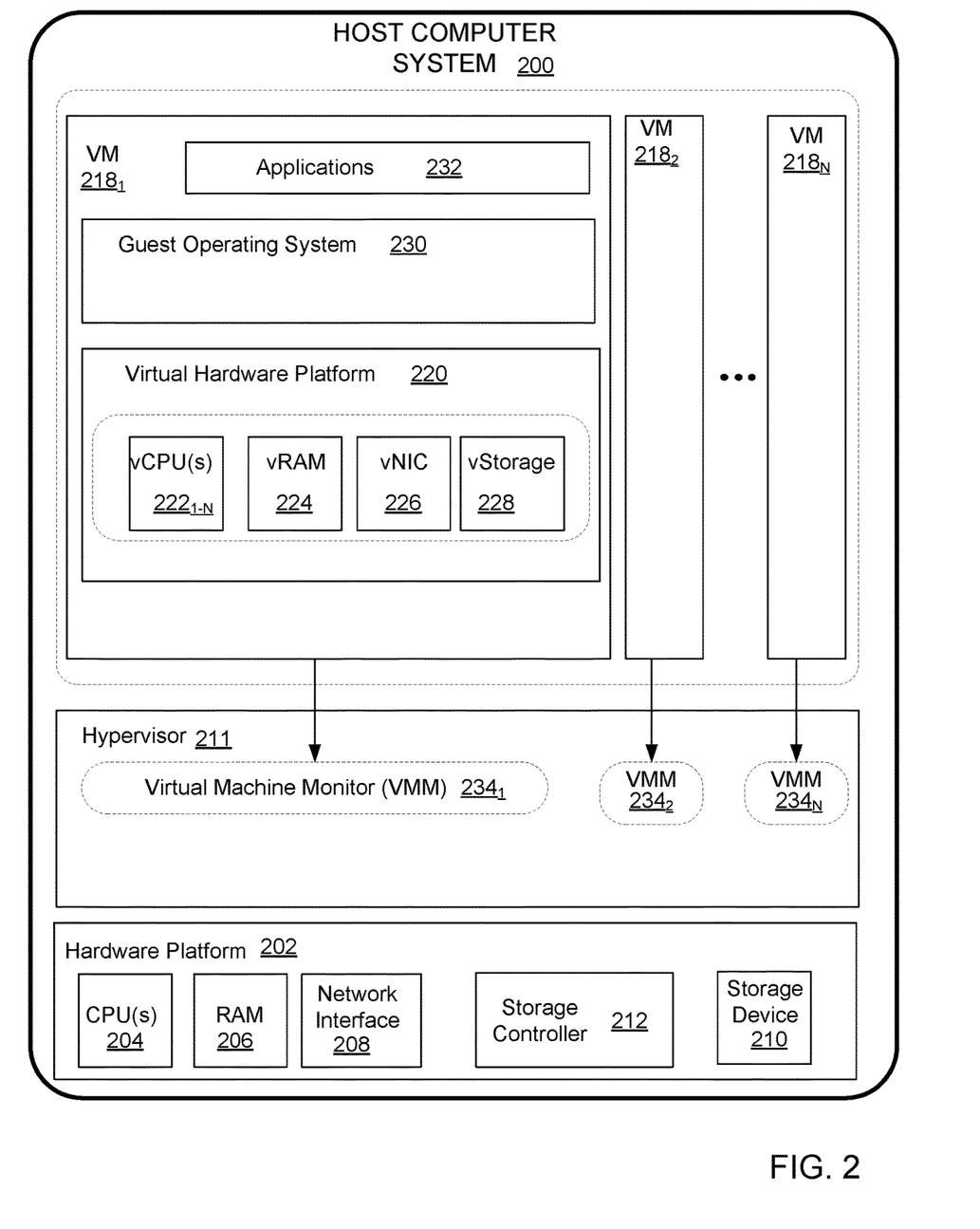
FIG. 2 depicts a host computer system.

FIG. 2 depicts a block diagram of a host computer system 200 that is representative of a virtualized computer architecture. As is illustrated, host computer system 200 supports multiple virtual machines (VMs) $218_1$-$218_N$, which are an example of virtual computing instances that run on and share a common hardware platform 202. Hardware platform 202 includes conventional computer hardware components, such as random access memory (RAM) 206, one or more network interfaces 208, storage controller 212, persistent storage device 210, and one or more central processing units (CPUs) 204. Central processing units 204 may include processing units having multiple cores.

A virtualization software layer, hereinafter referred to as a hypervisor 211, is installed on top of hardware platform 202. Hypervisor 211 makes possible the concurrent instantiation and execution of one or more VMs $218_1$-$218_N$. The interaction of a VM 218 with hypervisor 211 is facilitated by the virtual machine monitors (VMMs) $234_1$-$234_N$. Each VMM $234_1$-$234_N$ is assigned to and monitors a corresponding VM $218_1$-$218_N$. In one embodiment, hypervisor 211 may be a VMkernel™ which is implemented as a commercial product in VMware's vSphere® virtualization product, available from VMware™ Inc. of Palo Alto, Calif. In an alternative embodiment, hypervisor 211 runs on top of a host operating system, which itself runs on hardware platform 202. In such an embodiment, hypervisor 211 operates above an abstraction level provided by the host operating system.

After instantiation, each VM $218_1$-$218_N$ encapsulates a virtual hardware platform 220 that is executed under the control of hypervisor 211. Virtual hardware platform 220 of VM $218_1$, for example, includes but is not limited to such virtual devices as one or more virtual CPUs (vCPUs) $222_1$-$222_N$, a virtual random access memory (vRAM) 224, a virtual network interface adapter (vNIC) 226, and virtual storage (vStorage) 228. Virtual hardware platform 220 supports the installation of a guest operating system (guest OS) 230, which is capable of executing applications 232. Examples of guest OS 230 include any of the well-known operating systems, such as the Microsoft Windows™ operating system, the Linux™ operating system, and the like.

Figure 3:
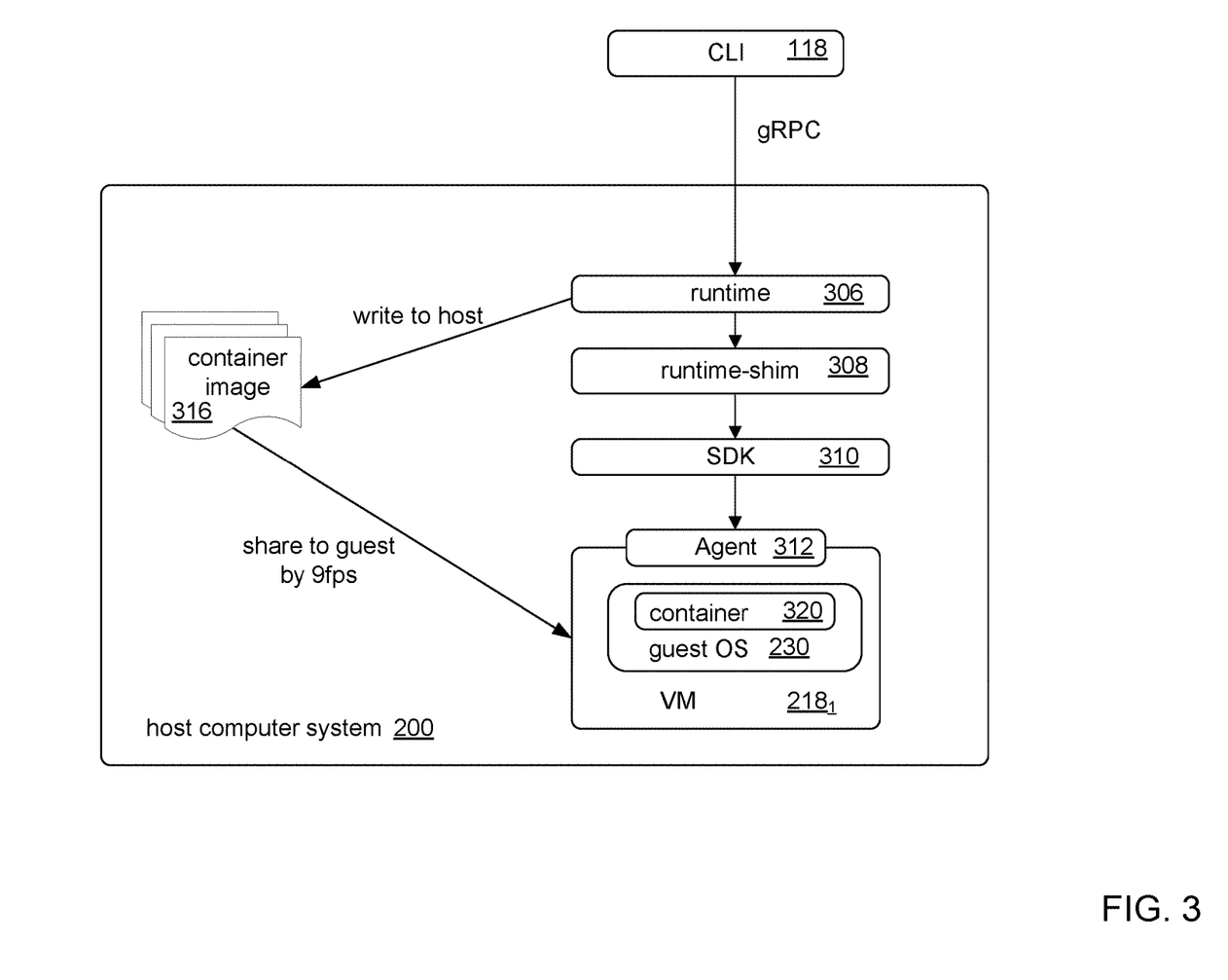
FIG. 3 depicts a configuration for running a container in a virtual machine that runs on a host computer system, in an embodiment.

FIG. 3 depicts a configuration for running a container in a virtual machine $218_1$ that runs on a host computer system 200, in an embodiment. In the configuration depicted, the host computer system 200 runs a virtual machine $218_1$, which in turn runs a guest operating system 230, such as the Linux operating system. The virtual machine $218_1$ has an interface agent 312 that is coupled to a software development kit (SDK) 310, which in turn, is coupled to a container runtime-shim 308. A container runtime 306 is coupled between the shim 308 and a command-line interface (CLI) 118 via a remote procedure call (RPC).

The virtual machine $218_1$ is a light-weight VM that is customized to run containers.

The SDK 310 is a wrapper for the VM $218_1$ and provides language support for interacting with the VM $218_1$.

The shim 308 is a process that becomes a parent process for container 320 when container 320 is created.

Runtime 306 is the process that manages the life cycle of the container 320. In particular, runtime 306 fetches a container image 316 when requested by the CLI 118. In some embodiments, runtime 306 is containerd 106.

The RPC, such as gRPC, performs two-way authentication of the CLI 118 and the runtime 306 and encodes data transferred between runtime 306 and CLI 118.

Figure 4A:
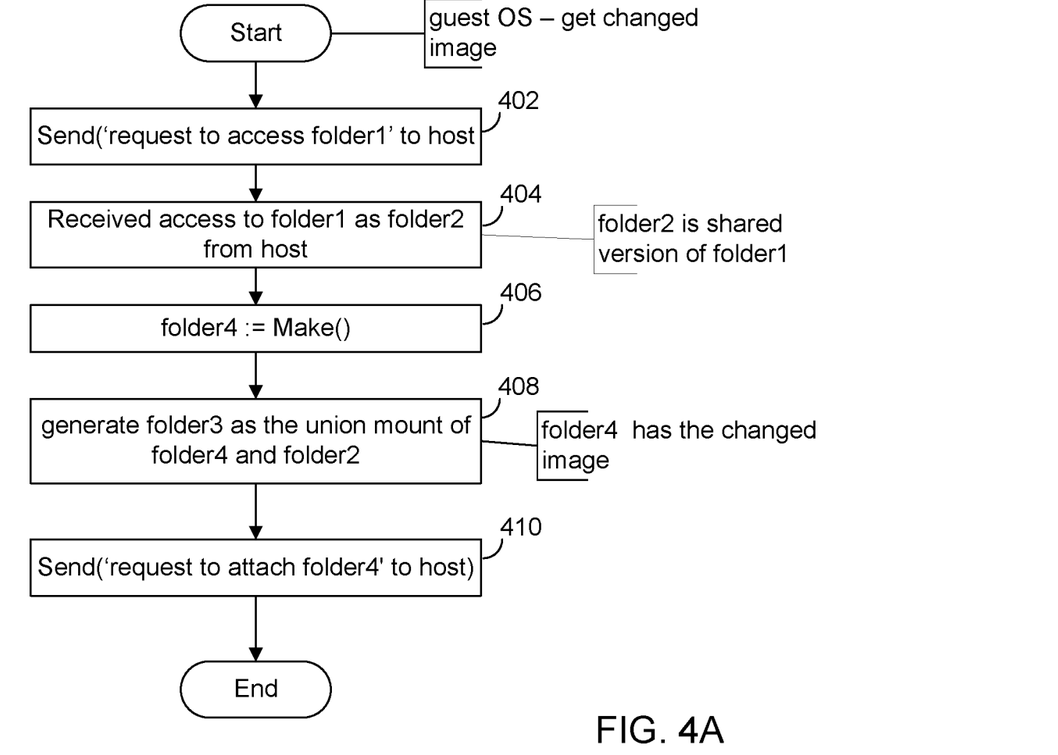
FIG. 4A depicts a flow of operations of the guest for obtaining a changed image of a container, in an embodiment.

FIG. 4A depicts a flow of operations of the guest operating system for obtaining a changed image of a container, in an embodiment. FIG. 4C provides a visual representation of the flow of operations in FIG. 4A. The flow of operations involves four folders, folder1 470, folder2 472, folder3 474, and folder4 476, each of which is a file system, file system sharing, and a type of file system mounting called union mounting.

File system sharing is available by utilizing the common internet file system (CIFS), which allows shared access to files and directories between machines and operates using a server message block (SMB) protocol. Sharing at the top-level directory causes the sharing of the entire file system whose root is the top-level directory. Access to a file in the shared file system is via a request for the name of the file and a response to the request in the form of a file ID. An alternative to CIFS is the u9fs file system, which uses the 9P protocol. Clients, which are processes of a server, transmit messages containing requests over a bidirectional communication path to the server, which returns replies to the client. In the protocol, a file id (an unsigned integer) sent by a client in an attach message is taken by the server to refer to the root of the file tree. Upon receipt of the file id at the server and an authentication phase, the client is permitted to access the file tree.

Union mounting combines multiple directories into one that appears to contain their combined contents. For example, if a CD-ROM is union mounted with a writable directory, then updating files in the union directly are reflected in the writable directory, though it appears that the CD-ROM's contents are updated.

Still referring to FIG. 4A, in step 402, the guest operating system 230 sends a request message to host computer system 200 requesting access to folder1 470 on host computer system 200. In step 404, the guest operating system 230 receives shared access to folder1 470, the host starting folder, as folder2 472, the guest starting folder, from host computer system 200. Folder2 472 is part of the file system of guest operating system 230. Folder2 472 contains the starting image of container 320. Any images of containers stored in repositories on host computer system 200 are always read-only images, as changes to the images are performed by adding layers on top of the read-only images. In step 406, the guest operating system 230 makes a new folder, folder4 476. In step 408, guest operating system 230 creates folder3 474 as the union mount of folder4 476 and folder2 472. The union mount of folder4 476 and folder2 472 causes all of the changes in folder3 474 to appear only in folder4 476 because folder2 472 is read-only and cannot be changed. In step 410, guest operating system 230 sends a request to host computer system 200 to attach folder4 476 to host computer system. Thus, folder4 476 contains the changed image.

Figure 4B:
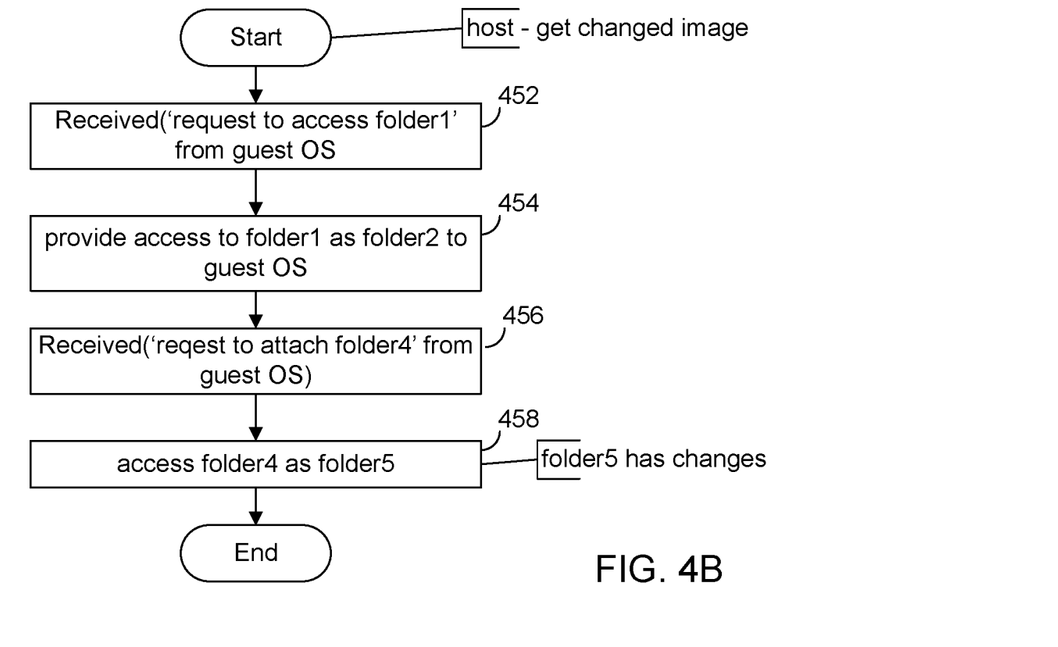
FIG. 4B depicts a flow of operations of the host for obtaining an image of a container, in an embodiment.
Figure 4C:
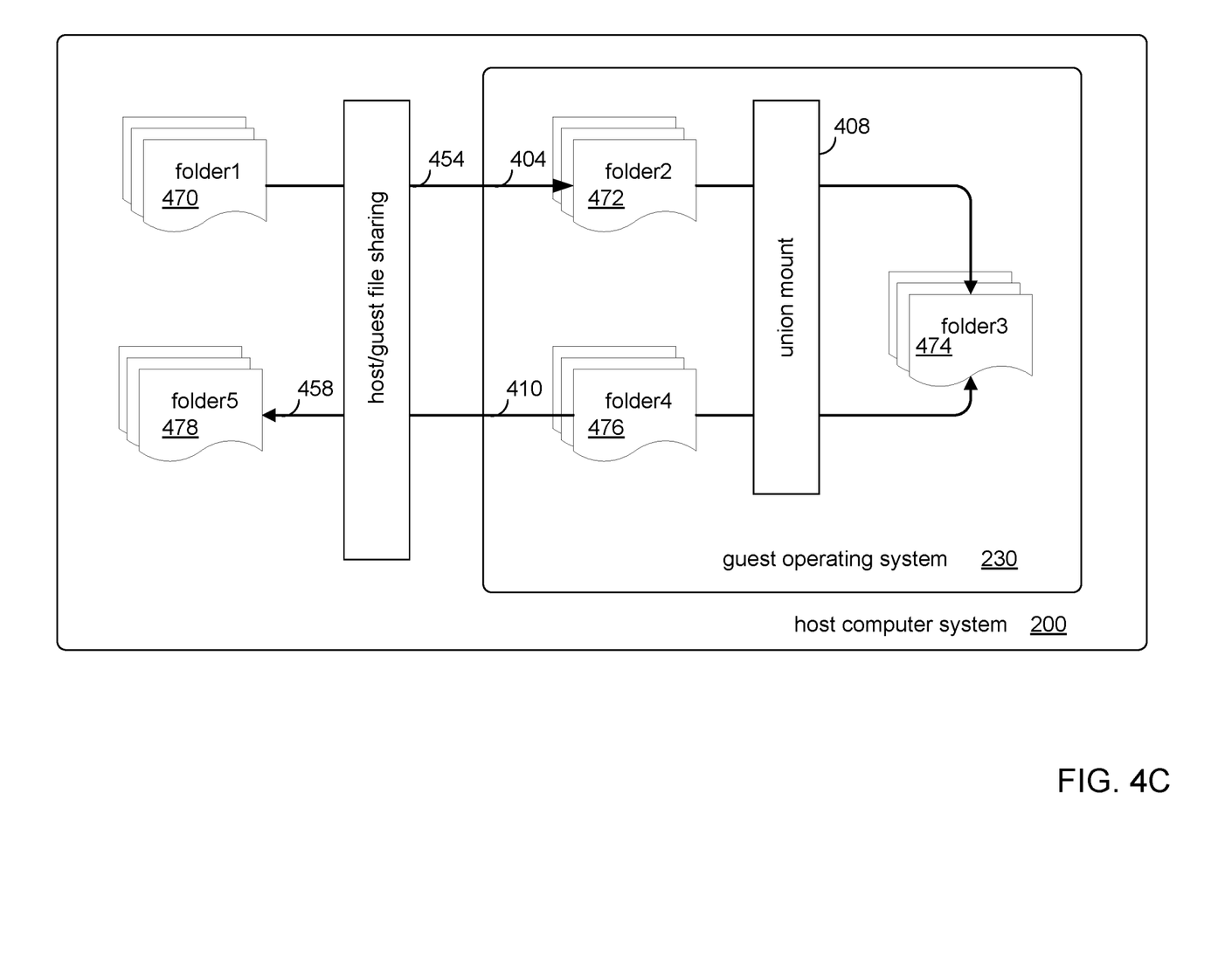
FIG. 4C depicts the flow of operations in FIGS. 4A and 4B, in an embodiment.

FIG. 4B depicts a flow of operations of the host computer system for obtaining an image of a container, in an embodiment. In step 452, host computer system 200 receives a request from guest operating system 230 to access folder1 470 in a file system of host computer system 200. In step 454, host computer system provides shared access to folder1 470 as folder2 472. In step 456, host computer system 200 receives a request from guest operating system 230 to attach folder4 476 to the file system in host computer system 200. In step 458, host computer system 200 accesses folder4 476, now attached, as folder5 478. Folder5 478 thus contains the changes to the starting image.

Thus, after the flow of operations of FIG. 4A and FIG. 4B, folder5 is available on a file system of host computer system 200 with the changes to the container image.

Figure 5A:
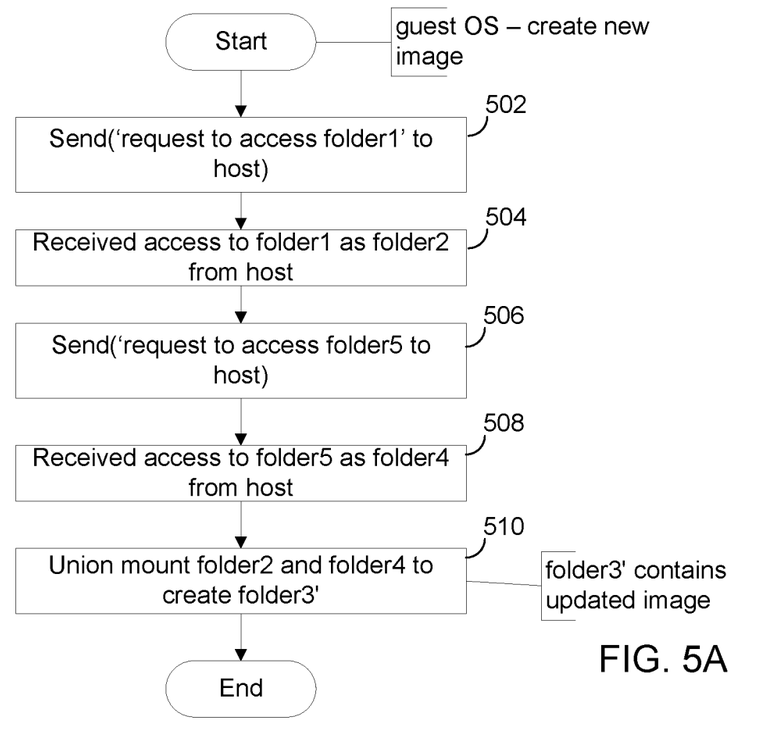
FIG. 5A depicts a flow of operations of the guest for creating a new image from changes to an existing image, in an embodiment.

FIG. 5A depicts a flow of operations of the guest for creating a new image from changes to a starting image, in an embodiment. FIG. 5C is a visual representation of the flow of operations in FIG. 5A. In step 502, guest operating system 230 sends a request to access folder1 470 to host computer system 200. In step 504, guest operating system 230 receives shared access to folder1 470 as folder2 472. In step 506, guest operating system 230 requests access to folder5. In step 508, guest operating system 230 receives shared access to folder5 478 as folder4 476 from host computer system 200. In one embodiment, step 502 and step 508 occur concurrently. In step 510, guest operating system 230 union mounts folder2 472 and folder4 476 to created folder3' 574, which contains a runnable image for the container with changes to the original image. The runnable image in folder3' 574 can be used for containers on guest operating system 230 as well as for containers in guest operating systems in different virtual machines, even virtual machines on different host computer systems.

Figure 5B:
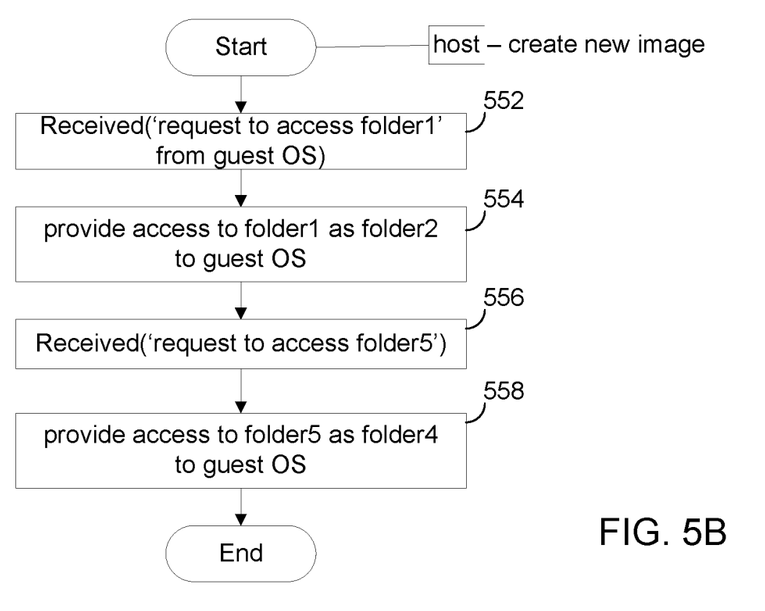
FIG. 5B depicts a flow of operations of the host for creating a new image from changes to an existing image.
Figure 5C:
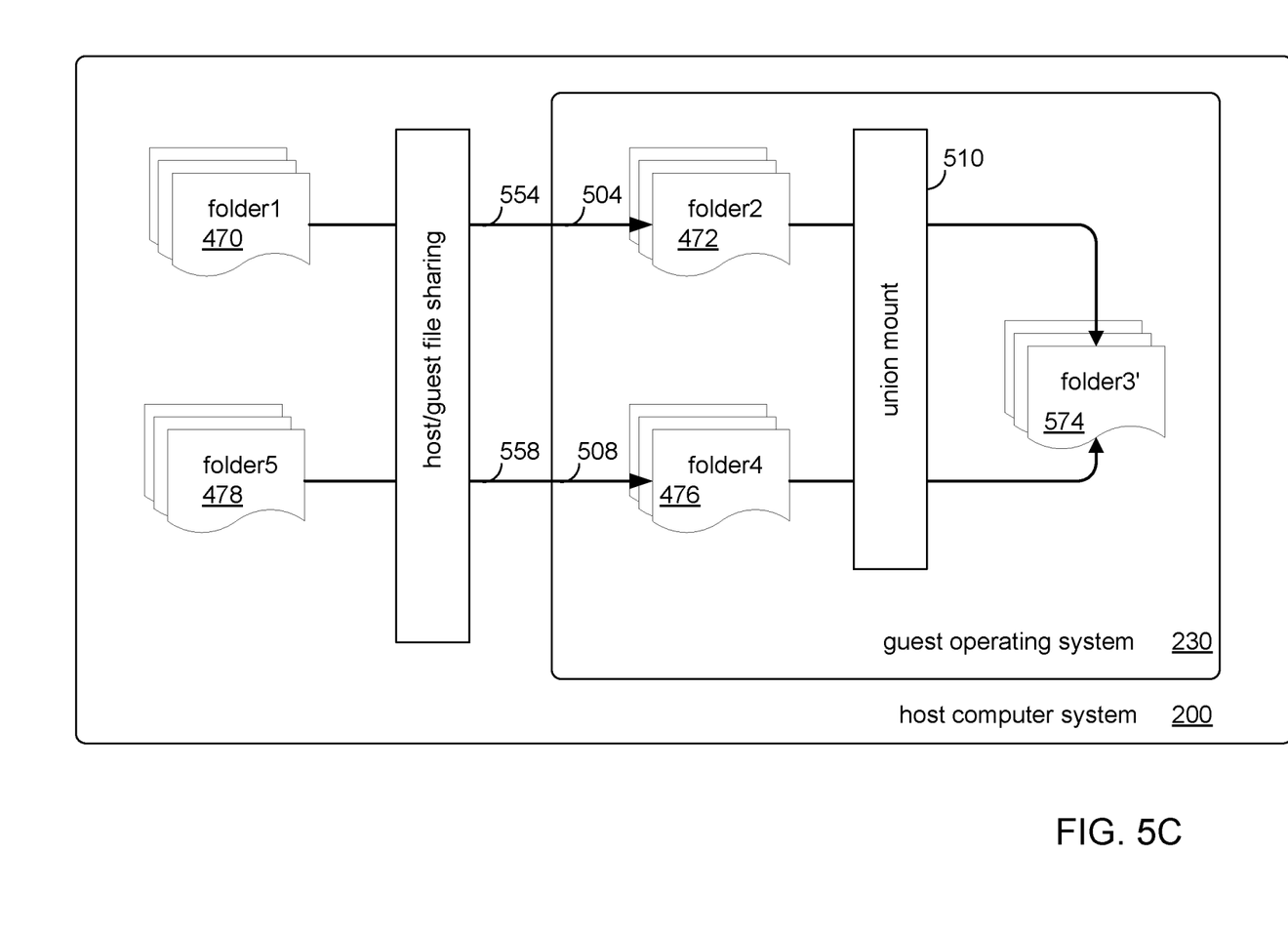
FIG. 5C depicts the flow of operations in FIGS. 5A and 5B, in an embodiment.

FIG. 5B depicts a flow of operations of the host for creating a new image from changes to an existing image. In step 552, host computer system 200 receives a request to access folder1 470 from guest operating system 230. In step 554, host computer system 200 provides shared access to folder1 470 as folder2 472 to guest operating system 230. In step 556, host computer system 200 receives a request for access to folder5 478 from guest operating system 230. In step 558, host computer system provides shared access to folder5 478 as folder4 476 to guest operating system 230. In an embodiment, steps 552 and 556 occur concurrently.

In summary, the flow of operations depicted in FIG. 5A and FIG. 5B results in folder4 in the guest containing a change image of a container. The changed image in folder3' 574 can be lodged in the registry and can made available to other containers in other guests.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer-readable media. The term computer-readable medium refers to any data storage device that can store data which can thereafter be input to a computer system— computer-readable media may be based on any existing or subsequently developed technology for embodying computer programs in a manner that enables them to be read by a computer. Examples of a computer-readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer-readable medium can also be distributed over a network coupled computer system so that the computer-readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization.

The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for committing changes of an image of a container running in a virtual machine (VM) on a host computer system, the method comprising:
    obtaining a guest starting folder containing a starting image for the container, wherein the guest starting folder resides in the virtual machine;
    while the container is running the starting image, storing changes made by the container running in the virtual machine to the starting image in a first guest union folder to generate a changed image for the container, wherein the first guest union folder is a union mount of a first new guest folder and the guest starting folder, and wherein the first new guest folder reflects the changes in the first guest union folder; and
    forming a second guest union folder as a union mount of a second new guest folder and the guest starting folder, the second new guest folder containing the changes to the starting image, and the second guest union folder containing the changed image.

2. The method of claim 1,
    wherein a guest file system of the VM is shared with a host file system of the host computer system; and
    wherein the host file system includes a host starting folder containing the starting image of the container and the guest starting folder is obtained from the host computer system by sharing the host starting folder as the guest starting folder in the guest file system.

3. The method of claim 2,
    wherein the host file system includes a new host folder; and
    wherein the host file system shares the new host folder as a first new guest folder of the guest file system, the first new guest folder containing the changes to the starting image.

4. The method of claim 2, wherein a container runtime fetches the starting image for the container from the host computer system and provides the starting image in the host starting folder.

5. The method of claim 4,
    wherein the starting image for the container resides in a repository for images on the host computer system; and
    wherein the images in the repository are read-only images.

6. The method of claim 1, wherein the changed image in the second guest union folder is stored in a repository of container images.

7. The method of claim 1, wherein a container runtime runs on the host computer system but does not run the starting image.

8. A host computer system comprising:
    one or more CPU s; and
    a memory coupled to the CPUs, wherein the memory has loaded therein system software that includes virtualization software for running one or more virtual machines, and a container runtime;
    wherein the system software runs the container runtime and one of the virtual machines runs a guest operating system with a container running as an application of the guest operating system; and
    wherein the guest operating system is configured to:
        obtain a guest starting folder containing a starting image for the container, wherein the guest starting folder resides in the virtual machine;
        while the container is running the starting image, store changes made by the container running in the virtual machine to the starting image in a first guest union folder to generate a changed image for the container, wherein the first guest union folder is a union mount of a first new guest folder and the guest starting folder, and wherein the first new guest folder reflects the changes in the first guest union folder; and
        form a second guest union folder as a union mount of a second new guest folder and the guest starting folder, the second new guest folder containing the changes to the starting image, and the second guest union folder containing the changed image.

9. The host computer system of claim 8,
    wherein a guest file system of the VM is shared with a host file system of the host computer system; and
    wherein the host file system includes a host starting folder containing the starting image of the container and the guest starting folder is obtained from the host computer system by sharing the host starting folder as the guest starting folder in the guest file system.

10. The host computer system of claim 9,
    wherein the host file system includes a new host folder; and
    wherein the host file system shares the new host folder as a first new guest folder of the guest file system, the first new guest folder containing the changes to the starting image.

11. The host computer system of claim 9, wherein the container runtime fetches the starting image for the container from the host computer system and provides the starting image in the host starting folder.

12. The host computer system of claim 11,
    wherein the starting image for the container resides in a repository for images on the host computer system; and
    wherein the images in the repository are read-only images.

13. The host computer system of claim 8, wherein the changed image in the second guest union folder is stored in a repository of container images.

14. The host computer system of claim 8, wherein a container runtime runs on the host computer system but does not run the starting image.

15. A non-transitory computer-readable medium comprising instructions executable in a computer system, wherein the instructions when executed in the computer system cause the computer system to carry out a method for committing changes of an image of a container running in a virtual machine (VM) on a host computer system, the method comprising:
    obtaining a guest starting folder containing a starting image for the container, wherein the guest starting folder resides in the virtual machine;

while the container is running the starting image, storing changes made by the container running in the virtual machine to the starting image in a first guest union folder to generate a changed image for the container,
wherein the first guest union folder is a union mount of a first new guest folder and the guest starting folder, and
wherein the first new guest folder reflects the changes in the first guest union folder; and
forming a second guest union folder as a union mount of a second new guest folder and the guest starting folder, the second new guest folder containing the changes to the starting image, and the second guest union folder containing the changed image.

16. The non-transitory computer-readable medium of claim 15,
wherein a guest file system of the VM is shared with a host file system of the host computer system; and
wherein the host file system includes a host starting folder containing the starting image of the container and the guest starting folder is obtained from the host by sharing the host starting folder as the guest starting folder in the guest file system.

17. The non-transitory computer-readable medium of claim 16,
wherein the host file system includes a new host folder; and
wherein the host file system shares the new host folder as a first new guest folder of the guest file system, the first new guest folder containing the changes to the starting image.

18. The non-transitory computer-readable medium of claim 16,
wherein a container runtime fetches the starting image for the container from the host computer system and provides the starting image in the host starting folder;
wherein the starting image for the container resides in a repository for images on the host computer system; and
wherein the images in the repository are read-only images.

19. The non-transitory computer-readable medium of claim 15, wherein the changed image in the second guest union folder is stored in a repository of container images.

20. The non-transitory computer-readable medium of claim 15, wherein a container runtime runs on the host computer system but does not run the starting image.

* * * * *